(No Model.)  3 Sheets—Sheet 1.
T. POWELL.
COMBINED HEADER AND THRASHER.
No. 323,961. Patented Aug. 11, 1885.
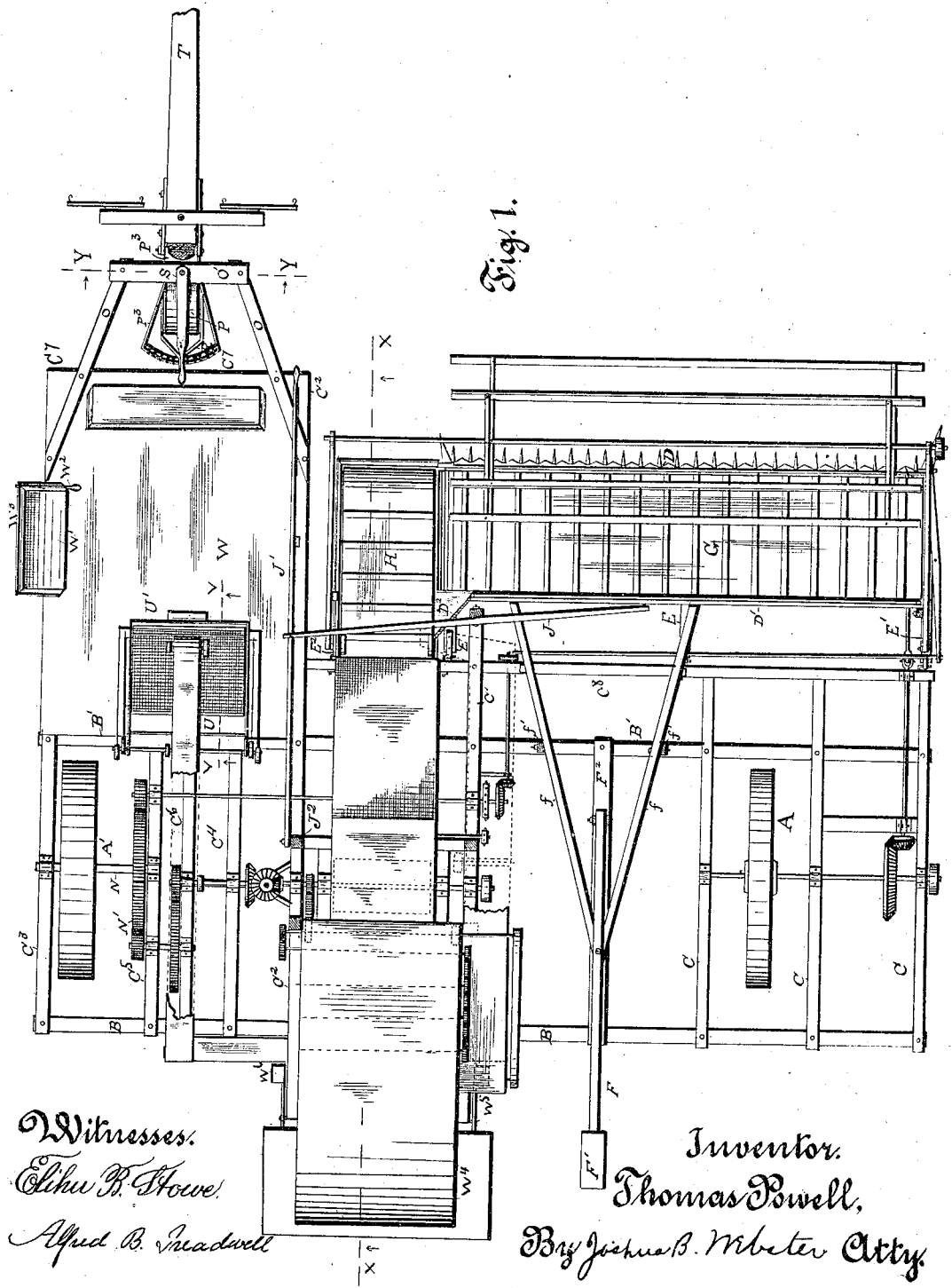

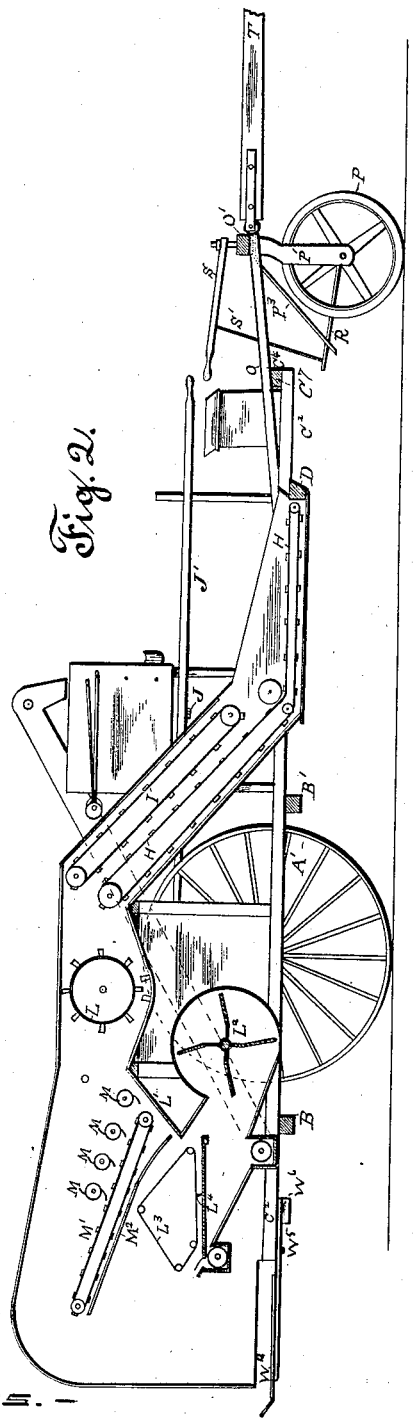

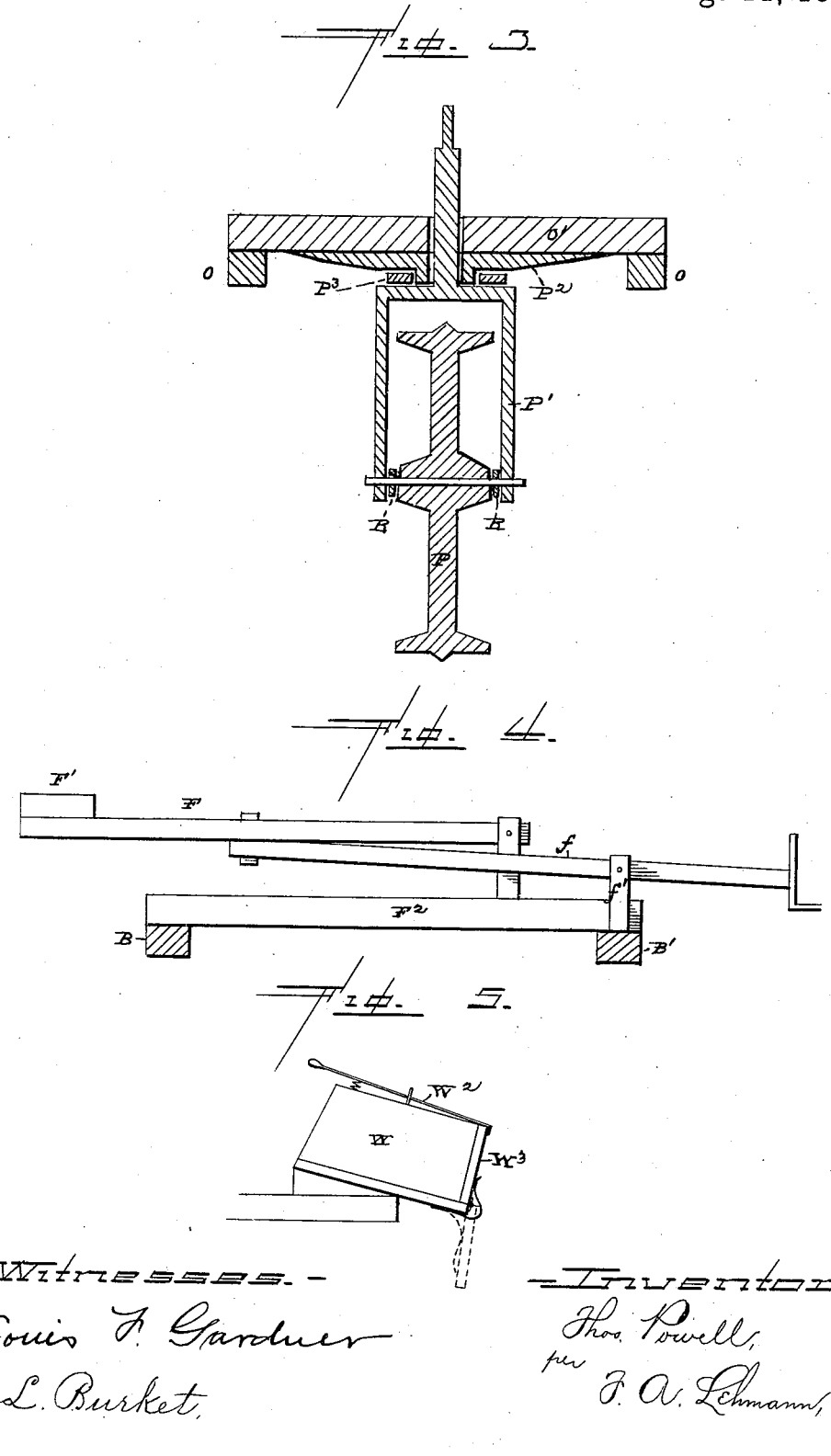

UNITED STATES PATENT OFFICE.

THOMAS POWELL, OF STOCKTON, CALIFORNIA, ASSIGNOR, BY DIRECT AND MESNE ASSIGNMENTS, TO THE STOCKTON COMBINED HARVESTER AND AGRICULTURAL WORKS, OF SAME PLACE.

COMBINED HEADER AND THRASHER.

SPECIFICATION forming part of Letters Patent No. 323,961, dated August 11, 1885.

Application filed January 19, 1884. (No model.)

*To all whom it may concern:*

Be it known that I, THOMAS POWELL, a citizen of the United States, residing at Stockton, in the county of San Joaquin and State of California, have invented certain new and useful Improvements in Combined Headers and Thrashers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of harvesting machines known as "headers and thrashers," by which the grain is cut, thrashed, cleaned, sacked, and delivered on the ground.

It consists of the devices, combination of devices, and construction hereinafter described, and particularly pointed out in the claims.

My invention is illustrated in the annexed drawings, in which Figure 1 is a plan of the entire machine. Fig. 2 is a vertical longitudinal section taken on the line $x\,x$, Fig. 1. Fig. 3 is a section of the steering-wheel and frame on the line $y\,y$, Fig. 1; Fig. 4, a detail side elevation of the balancing-lever; Fig. 5, an end view of the dumping-box.

A represents the grain or outer carrying-wheel of the machine, and A' the main or driving wheel, its office being also to carry the inner side of the machine-frame, the main portion of the frame being supported by it.

B is the rear main timber, and B' the corresponding front main timber, of the machine-frame.

C C C are the outer cross-timbers, uniting the ends of the timbers B and B', and carrying the axle of the wheel A, upon which axle are suitable gearing and pulleys to propel the receiving draper and reel of the header.

C' is an inside timber, also uniting timbers B and B'.

$C^2$ and $C^3$ are long cross-timbers, uniting the timbers B and B', and with the parallel cross-timbers $C^4$, $C^5$, and $C^6$, carrying the shifting and driving gearing of the wheel A'.

$C^7$ is a cross-timber uniting the front ends of the timber $C^2$ and $C^3$.

Upon that portion of the frame formed by the timbers B and B' C' and $C^2$ is the thrasher, and upon that formed by the timbers B and B' $C^2$ and $C^3$ is a delivery-platform, W, cleaner, and sacker.

The above-described frame, connected together as shown, constitutes the carrying frame and vehicular portion of the machine. The manner of propelling it will hereinafter be explained.

$C^8$ is a timber parallel and in front of the timber B', and connecting the front ends of the timbers C C C, being attached to their tops and extending inwardly, receives the timber C' near its front end upon its top.

The header consists of a front timber, D, containing the guard-fingers and sickle, and is better known as the "finger-bar," and a corresponding back timber, D', set sufficiently in the rear to contain the main or receiving draper G, which revolves on rollers set at each end of the frame composed of the timbers D and D'. The timbers D and D' are connected to the timber $C^8$ by two center girders, E E, an outer girder, E', and an inner girder, $E^2$, the rear ends of these girders being properly hinged to the timber $C^8$, thus permitting the header-frame to be depressed or elevated at any desired pitch or slope, which is regulated by a system of compound levers adapted for the purpose, and constructed as follows: A balancing-lever, F, having a balance-weight, F', attached to its rear end, is flexibly attached at its front end to its timber $F^2$, whose ends are attached to the frame-timbers B and B', the said lever F extending rearwardly over the timber B. To the sides of the lever F are flexibly attached diverging levers $f\,f$, having their fulcrums in jaws attached to the timber B', and their front ends attached flexibly to the rear of the header-timber D'. A connecting-lever, J, is flexibly attached at one end to the timber D', between the levers $f$, and, passing over the inside lever, has a fulcrum on a post on the front end of the timber C', and is flexibly attached to a hand-lever, J', which is attached pivotally at its rear end to a post, $J^2$, attached to the timber C². The front end of the lever J' is within easy reach of the driver, who, by the aid of the above-described connecting-leverage mechanism, controls the pitch or slope of the header-frame. The front of the machine is supported by a wheel, P, which also performs the function of a guide-wheel. Diagonal braces O, attached to timber C⁴, are united at their front ends by a cross-timber O', to which is attached the pole or tongue T with double-trees. The timber O' has a vertical hole through it and an iron plate, P², attached beneath with a corresponding hole, forming a seat for the steering-wheel standard P', which has a forked lower end for the reception of the steering-wheel P.

P³ is an iron yoke attached to the rear end of the pole T, and extending rearward and encompassing the wheel P, and having notches in its rear portion.

R is a forked iron attached to the axle of the steering-wheel P, and having a tongue at its apex adapted to engage with any one of the notches in the yoke P³.

S' is an iron rod attached to the tongue of the forked iron R, and, extending upward, is attached to the tiller S upon the apex of the standard P', which tiller can be elevated or depressed at its point. The handle of tiller S, being within reach of the driver, may be elevated by him, so that by means of the connecting-rod S' the tongue of the iron R can be raised from the notches of the yoke P³ when it is desired to deviate the wheel P from a straight course.

When this last-described mechanism is at rest, the steering-wheel P is fixed in one position by the engagement of the tongue of the iron R in one of the notches of the yoke P³, and then serves its primary object of supporting the front of the machine.

The cut grain, having been deposited upon the receiving-draper G by the action of the sickle and reel, is conveyed by the draper G to a feeding-draper, H, located between the girder E² and the first girder, E. Being supported on the header-frame, this draper is depressed and elevated simultaneously with the main or receiving draper G, and receives from the said draper G all the grain deposited thereon. The grain passes rearward up the sloping portion of the apron H to the thrasher, being in its course aided by an oppositely-turning draper, I, parallel with the sloping portion of the said apron H, the top surface of apron H, and the bottom surface of the draper I, both moving in the same direction and carrying the full volume of grain to the thrasher L.

In order to facilitate the delivery from the draper G to the feeder H, a triangular horizontal board, D², is placed at the intersection of the inside girder, E, and timber D', upon the rear edge of which board is attached an upright fender, preferably, of sheet-iron. By this device a freer delivery of the straw is secured than if the turn at the corner were a right angle. The clean grain passes from the shoe of the thrasher by a series of troughs and elevators to a cleaner and sack-filler located upon a platform, W, upon which is stationed the operator, who, as each sack is filled and secured, deposits it upon a receiving-box, W', at the outer edge of the platform W, which has a hinged outer leaf, W³, which is released by the action of a hand-lever, W², so as to permit the filled sack to drop from the box W' to the ground. A spring beneath the box W' returns the leaf W³, when relieved of the weight of the sack, to its first position, and the hand-lever W², being provided with a spring locking device, is secured for reception of another filled sack.

No claims are made in this application to any of the parts which constitute the thrasher, as they will form the subject-matter of another application. These parts are shown in this application only for the purpose of showing a combined header and thrasher.

I am aware that some of the features described by me and shown in the drawings are not new; but

What I claim as being new and of my own invention is—

1. The frame carrying the thrasher, composed of the main timbers, in combination with the cross-timbers C, sustaining the axle of the wheel A, and the cross-timbers sustaining the axle of the wheel A', and the gearing connected therewith, two of the said cross-timbers sustaining the axle of said wheel A', and connections being extended and connected at their free ends, substantially as and for the purpose specified.

2. The balancing-lever, with its weight at the rear, and its front end flexibly attached to the timber F², in combination with the diverging levers $f f$, fulcrumed upon posts upon the timber B', and their free ends flexibly attached to the rear of the timber D' of the feeder-frame, substantially as and for the purpose specified.

3. The combination, with the main frame-timbers and cross-timber F², of the timber D' of the header-frame, the balancing-lever with its foot attached to timber F², and the diverging-levers $f f$, attached at their front ends to the timber D' and at their rear ends to said balancing-lever, substantially as and for the purpose specified.

4. The combination of the hand-lever J, pivoted at its inner end to the lever J' and at its outer end to the timber D', and fulcrumed on a post attached to the front end of the timber C', substantially as and for the purpose specified.

5. The combination of the timber O', connected to the platform W by the diagonal braces O O, the pole T, attached to the front of the timber O', the plate P², located beneath and attached to the timber O', the standard P', carrying the steering-wheel P, the adjustable tiller S, the forked iron R, the rod S', and the yoke P³, substantially as and for the purpose specified.

6. The combination of the timber O', the plate P², secured thereto, the timbers O O, the platform W, the pole T, and the standard P', carrying the wheel P and seated in a hole through the plate P² and timber O', substantially as and for the purpose specified.

7. The combination, with the pole T, of the yoke P³, secured to the rear end of said pole and provided with the forked iron R, encompassing the steering-wheel P, and attached to the axle of the same, and having a tongue adapted to engage the notches in the yoke P³, substantially as and for the purpose specified.

8. In a combined header and thrasher, the combination, with the receiving-draper G, and feeding-draper H, arranged at right angles to each other, of the horizontal triangular board D², attached to the timber D' and girder E at their intersections, substantially as and for the purpose specified.

9. The combination of the platform W, the receiving-box W', having the drop-leaf W³, and hand-lever W², substantially as and for the purpose specified.

10. In a combined traveling thrasher and header, the sack-tender's platform W, having the sack-discharging apparatus at its outer edge, in combination with the timbers C³, C², and C', the thrasher and separator located upon said frame and between the timbers C' and C², and resting upon the timbers B and B', the timbers C, the timber C⁸ uniting said timbers C, C', and C², and the header-frame having the girders E, E', and E² hinged to said timber C⁸, substantially as and for the purpose specified.

In testimony whereof I affix my signature in presence of two witnesses.

THOMAS POWELL.

Witnesses:
ELIHU B. STOWE,
JOSHUA B. WEBSTER.